United States Patent
Tsunehara et al.

(10) Patent No.: US 7,116,992 B1
(45) Date of Patent: Oct. 3, 2006

(54) MOBILE STATION USING POSITIONAL INFORMATION

(75) Inventors: Katsuhiko Tsunehara, Kokubunji (JP); Mikio Kuwahara, Kokubunji (JP); Ayumu Koide, Yokohama (JP); Nobukazu Doi, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/601,132

(22) PCT Filed: Apr. 5, 2000

(86) PCT No.: PCT/JP00/02195

§ 371 (c)(1),
(2), (4) Date: Jul. 27, 2000

(87) PCT Pub. No.: WO01/77621

PCT Pub. Date: Oct. 18, 2001

(51) Int. Cl.
*H04M 1/00* (2006.01)

(52) U.S. Cl. .................. 455/456.6; 455/456.1

(58) Field of Classification Search ............ 455/456.6, 455/456.1, 67.11; 701/207
See application file for complete search history.

(56) References Cited

U.S. PATENT DOCUMENTS

| | | | |
|---|---|---|---|
| 4,977,509 A | | 12/1990 | Pitchford et al. |
| 5,835,881 A | | 11/1998 | Trovato et al. |
| 6,011,973 A | * | 1/2000 | Valentine et al. ......... 455/456.6 |
| 6,085,096 A | * | 7/2000 | Nakamura ............... 455/456.6 |
| 6,487,393 B1 | * | 11/2002 | Davenport et al. ........ 455/67.7 |

FOREIGN PATENT DOCUMENTS

| | | |
|---|---|---|
| JP | 1-173817 | 7/1989 |
| JP | 6-103498 | 4/1994 |
| JP | 7-181242 | 7/1995 |
| JP | 9-35192 | 2/1997 |
| JP | 9-44754 | 2/1997 |
| JP | 9-130859 | 5/1997 |
| JP | 10-38993 | 2/1998 |
| JP | 10-308687 | 11/1998 |
| JP | 10-332407 | 12/1998 |
| JP | 11-18159 | 1/1999 |
| JP | 11-83529 | 3/1999 |
| JP | 11-251999 | 9/1999 |
| JP | 2000-28391 | 1/2000 |
| JP | 2000-75012 | 3/2000 |

OTHER PUBLICATIONS

Hiroaki Koshima et al, "Personal Locator Services Emerge" IEEE Spectrum, Communications XP-000948853, Feb. 2000, pp. 41-48.

* cited by examiner

*Primary Examiner*—Mathew D. Anderson
*Assistant Examiner*—Lewis West
(74) *Attorney, Agent, or Firm*—Mattingly, Stanger, Malur & Brundidge, P.C.

(57) ABSTRACT

When a person of holding a mobile station gets near to a previously set target position, application 200 is started and service of utilizing positional information is provided to the person of holding the mobile station or a third party. The mobile station includes a position comparator 103 for comparing a current position of the mobile station calculated by a position calculator 102 by using a signal from an antenna 100 with a target position inputted from means for target position input 104 and an application controller 106 for controlling the application 200 by using a result of position comparison 120. Further, a frequency of position calculation is pertinently controlled in the position calculator 102 by a position calculation controller 107 operated by the result of position comparison 120.

13 Claims, 4 Drawing Sheets

MOBILE STATION USING POSITIONAL INFORMATION

TECHNICAL FIELD

The present invention relates to a mobile station for providing a user with a service using positional information.

BACKGROUND ART

As methods of measuring a current position of a mobile station, there have been developed several methods. For example, a method of using GPS (Global Positioning System) has already been put into practice in a car navigation system or the like. Further, in a mobile communication system, there has been proposed a method of receiving radio wave transmitted from a base station by a mobile station and calculating a current position by using propagation time of the radio wave (refer to, for example, Japanese Patent Laid-Open (Kokai) No. Hei 7-181242).

As a service using the current position of the mobile station calculated by the above-described method, there is map display in navigation (refer to, for example, Japanese Patent Laid-Open (Kokai) No. Hei 1-173817). As approaching a destination, the scale of the map is changed and a route to the destination is selectively displayed.

Further, there also is Japanese Patent Laid-Open (Kokai) No. Hei 9-130859 in which although measurement of position is not carried out, in order to prevent ride past a station, entering a zone of a base station installed at the station is detected by checking a discrimination signature, whereby arrival at a destination is informed.

DISCLOSURE OF INVENTION

The inventors have investigated that various services can be provided by adding a mobile station with a function of knowing a current position and corresponding the current position with a target position of a destination or the like. There are enumerated services which seem to be able to be realized as problems, as follows.

As a first problem, it is pointed out that, for example, when a person of holding a mobile station rides on an electric train or a bus, a station or a bus stop to get off the electric train or the bus is previously set and when the electric train or the bus gets near to the station or the bus stop, by informing the fact to the person of holding the mobile station, the person is prevented from missing the station or the bus stop which may occur because the person falls into a doze in the electric train or the bus, or the person fails to hear announcement in the vehicle.

As a second problem, it is pointed out that, for example, a mobile station is previously registered with a dangerous site of a pond or a road having a large traffic amount, the mobile station is carried by a wondering old man or a child and when the wondering old man or the child gets near to such a dangerous site, the fact is conveyed to a protector staying at home and the protector proceeds to protect the wondering old man or the child to thereby avoid danger.

As a third problem, it is pointed out that, for example, a mobile station is previously registered with positional information of one's own house, the mobile station is carried by a wondering old man or a child and when the wondering old man or the child is remote from one's own house by a previously set distance or more, the fact and the current position of the wondering old man or the child is conveyed to the protector staying at home and the protector proceeds to protect the wondering old man or the child.

As a fourth problem, it is pointed out that when the mobile station is a portable telephone, the portable telephone is previously registered with a site in which the portable telephone is prohibited to use as in, for example, a hospital or the like or a site in which ringer of the portable telephone is to be put off as in a movie theater or the like, when a person holding the portable telephone enters the registered site, power or ringer of the portable telephone is automatically put off and when the person is remote from the registered site, power or ringer is automatically put on.

These problems (services) are realized by providing the person of holding the mobile station, the protector or the mobile station itself with operation in accordance with object. For that purpose, it is necessary that the mobile station is provided with application in correspondence with the operation and the application is controlled in accordance with a previously set target position and the current position of the mobile station. However, according to the conventional technology, there is simply carried out a display with regard to the current position and the target position and the above-described application control has not been realized.

It is an object of the present invention to provide a mobile station solving the above-described problems and utilizing position information having application directly operated to a user or an apparatus with a relationship between a current position and a target position as an index.

That is, in order to solve the above-described problems, according to an aspect of the present invention, there is provided a mobile station comprising a signal receiver for receiving radio wave, a position calculator for calculating a current position from a result of reception provided by the signal receiver, means for target position input for inputting a position constituting a target, a target position holder for holding the target position inputted from the means for target position input, a position comparator for comparing the current position of the mobile station calculated by the position calculator with the target position held at the target position holder, an application operated to a user based on a result of comparison of the position comparator, and an application controller for controlling operation of the application by using the result of position comparison by the position comparator.

In order to solve the above-described problems, according to other aspect of the present invention, there is provided a mobile station, wherein the application is a vibration generator for executing generation and abeyance of vibration for vibrating the mobile station and the application controller is a vibration controller for executing a control of the generation and the abeyance of the vibration of the vibration generator.

In order to solve the above-described problems, according to still other aspect of the present invention, there is provided a mobile station, wherein the application is an alarm generator for executing generation and abeyance of alarm from the mobile station and the application controller is an alarm controller for executing a control of the generation and the abeyance of the alarm of the alarm generator.

In order to solve the above-described problems, according to still other aspect of the present invention, there is provided a mobile station, wherein the application includes means for making a telephone call for making a telephone call, a telephone number holder for holding a telephone number of a message destination used in making the telephone call by the means for making a telephone call and a telephone message holder for holding a message transmitted after making the telephone call and the application controller is a telephone call controller for controlling to make the telephone call of the means for making a telephone call.

In order to solve the above-described problems, according to still other aspect of the present invention, there is provided a mobile station, wherein the application is a switch of ringer for switching a ringer when there is telephone signal arrival at the mobile station and the application controller is a ringer controller for controlling switching operation of the switch of ringer.

In order to solve the above-described problems, according to still other aspect of the present invention, there is provided a mobile station, wherein the application is a switch of power supply for switching power supply to the mobile station and the application controller is a power supply controller for controlling switching operation of the switch of power supply.

BEST MODE FOR CARRYING OUT THE INVENTION

Figure 1:
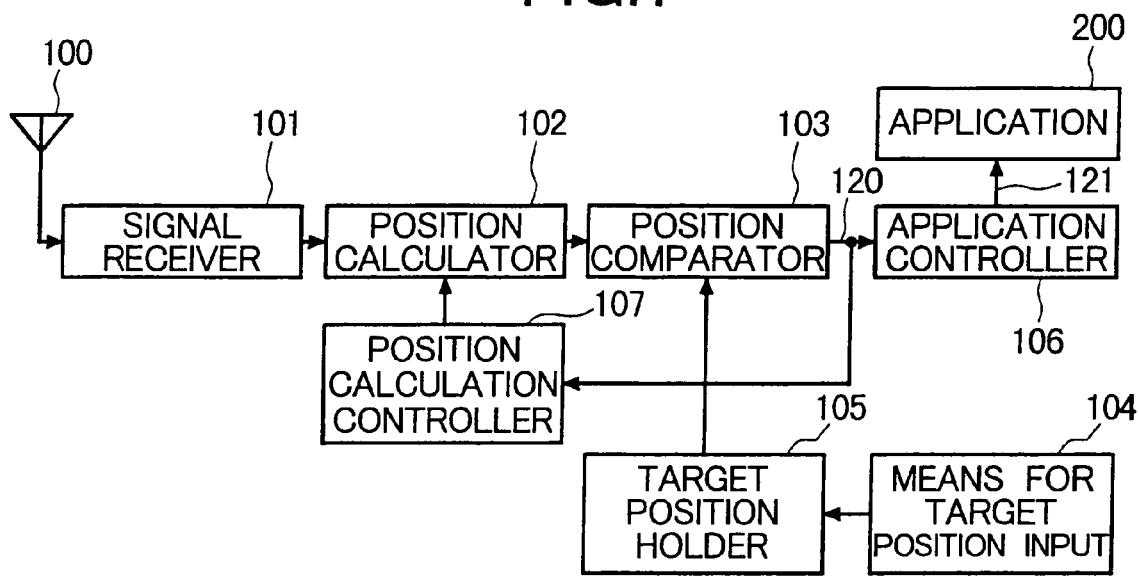
FIG. 1 is a constitution diagram for explaining a best mode of a mobile station according to the present invention.

A further detailed explanation will be given of a mobile station according to the present invention in reference to embodiments shown in the drawings as follows. Further, the same notations in FIG. 1 through FIG. 10 designate the same portions or similar portions.

FIG. 1 shows a constitution of an embodiment of a mobile station according to the present invention. In FIG. 1, numeral 101 designates a signal receiver for processing a received signal received by an antenna 100, numeral 102 designates a position calculator for extracting information necessary for position calculation from the signal processed by the signal receiver 101 and calculating a current position of the mobile station, numeral 104 designates means for target position input constituting an interface for inputting a target position, numeral 105 designates a target position holder for storing data of the target position inputted from the means for target position input 104, numeral 103 designates a position comparator for comparing a result of the position calculation of the mobile station inputted from the position calculator 102 with the target position inputted from the target position holder 105, numeral 107 designates a position calculation controller for controlling execution and abeyance of the position calculation in the position calculator 102, numeral 200 designates an application of executing a predetermined service and numeral 106 designates an application controller for controlling operation of the application 200.

Although according to the above-described embodiment, a keyboard is used as the means for target position input 104, otherwise, there can be used an interface of a bar code (refer to, for example, Japanese Patent Laid-Open (Kokai) No. Hei 6-103498), voice, image or the like. Further, as a result of comparison 120 outputted by the position comparator 103, there is utilized, for example, a distance between the result of the position calculation and the target position. Further, the application controller 106 generates an application control signal 121 for controlling the application 200 by inputting the result of comparison 120.

Figure 2:
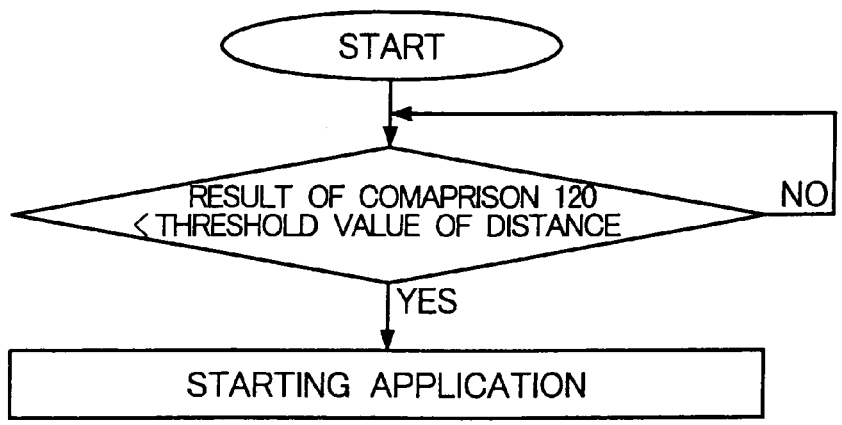
FIG. 2 is a flowchart diagram for explaining a first example of operation of an application controller.
Figure 3:
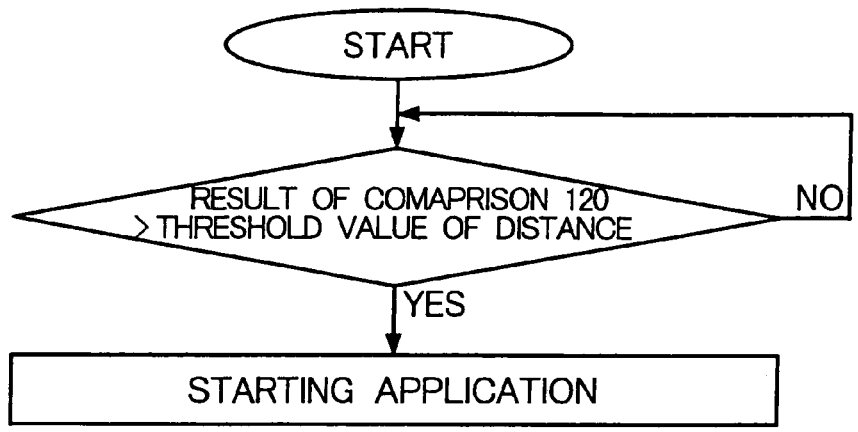
FIG. 3 is a flowchart diagram for explaining a second example of operation of an application controller.

Here, FIG. 2 and FIG. 3 show examples of operation of the application controller 106 when the distance between the result of the position calculation and the target position is used as the result of comparison 120.

In FIG. 2, when the result of comparison 120 becomes smaller than a previously set threshold value of distance, the application controller 106 starts the application 200 by transmitting the application control signal 121 and when the result of comparison 120 becomes larger than the threshold value of distance, the application controller 106 does not start the application 200 and brings about a state on standby for determination at a succeeding time. That is, in FIG. 2, when the current position of the mobile station gets near to the target position, the application 200 is started.

In the meantime, in FIG. 3, when the result of comparison 120 becomes larger than the previously set threshold value of distance, the application controller 106 transmits the application control signal 121 and starts the application 200. That is, in FIG. 3, when the current position of the mobile station becomes remote from the target position, the application 200 is started.

The application 200 is controlled by the application control signal 121 inputted from the application controller 106 and provides a service to a user of the mobile station, a third party of the protector of the user or the like. FIG. 4 through FIG. 10 show examples of applications for executing predetermined services.

Figure 4:
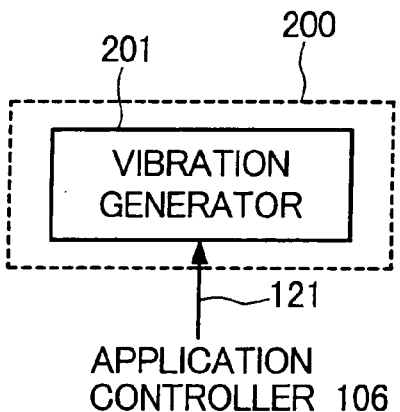
FIG. 4 is a constitution diagram for explaining a first example of application.

A first example of the application 200 shown in FIG. 4 is provided with a vibration generator 201 for providing the mobile station with vibration. For example, when the mobile station gets near to the target position, the vibration generator 201 generates vibration by receiving the application control signal 121 and informs the user of the mobile station that the user gets near to the target position. The vibration generator 201 can be constituted by, for example, a small motor or the like.

Figure 5:
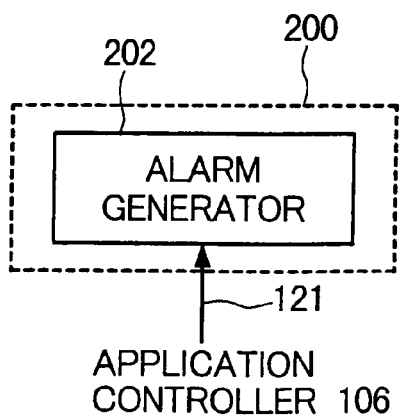
FIG. 5 is a constitution diagram for explaining a second example of application.

A second example of the application 200 shown in FIG. 5 is provided with an alarm generator 202. For example, when the mobile station gets near to the target position, the alarm generator 202 emits an alarm from the mobile station by receiving the application control signal 121, thereby, informs the user of the mobile station that the user gets near to the target position. As the alarm generated by the alarm generator 202, for example, voice message, alarm sound or the like can be used.

Figure 6:
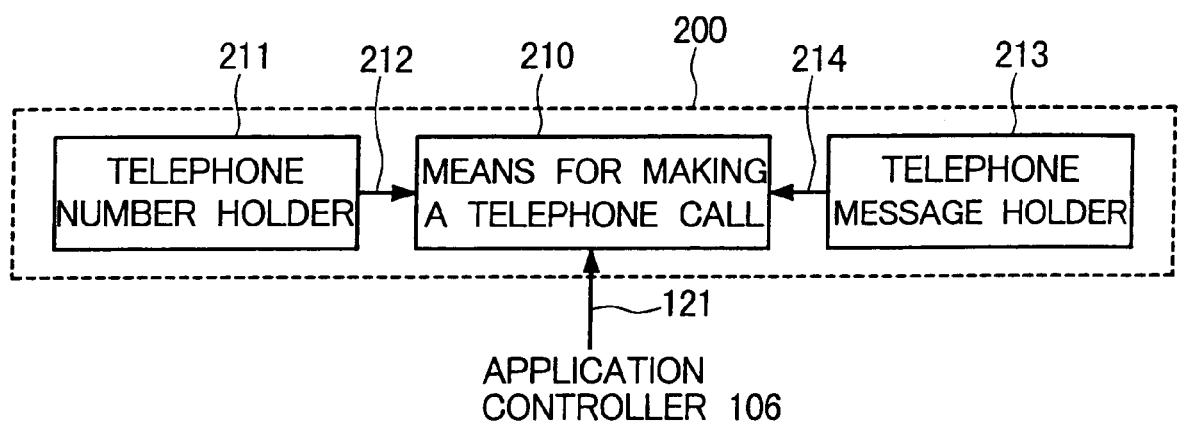
FIG. 6 is a constitution diagram for explaining a third example of application.

A third example of the application 200 shown in FIG. 6 is provided with means for making a telephone call 210, a telephone number holder 211 and a telephone message holder 213. When the application 200 is started by receiving the application control signal 121, the means for making a telephone call 210 makes a telephone call to a telephone number 212 previously registered in the telephone number holder 211 and transmits a telephone message 214 previously registered in the telephone message holder 213. As the telephone message 214 registered in the telephone message holder 213, for example, voice message may be used and as content of the message, for example, there may be used a message that the person of holding the mobile station gets near to the target position.

Figure 7:
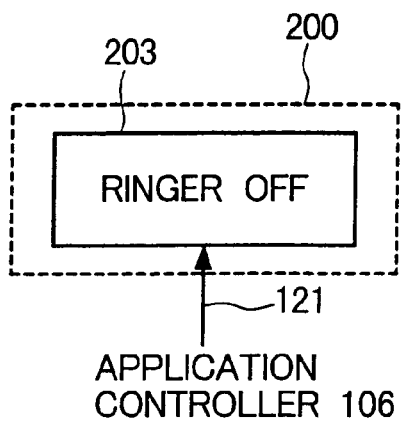
FIG. 7 is a constitution diagram for explaining a fourth example of application.
Figure 8:
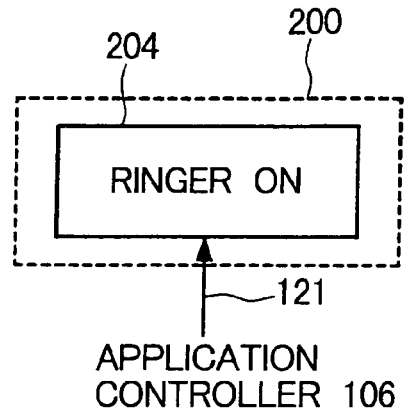
FIG. 8 is a constitution diagram for explaining a fifth example of application.

A fourth example of the application 200 shown in FIG. 7 is provided with a circuit 203 (for example, switch circuit) for making off ringer of the mobile station and stops emittance of ringer which is normally rung in the case of signal arrival at the mobile station in accordance with the application control signal 121. On the other hand, a fifth example of the application 200 shown in FIG. 8 is provided with a circuit 204 (for example, switch circuit) for making on ringer of the mobile station and rings ringer normally in the case of signal arrival at the mobile station in accordance with the application control signal 121.

Figure 9:
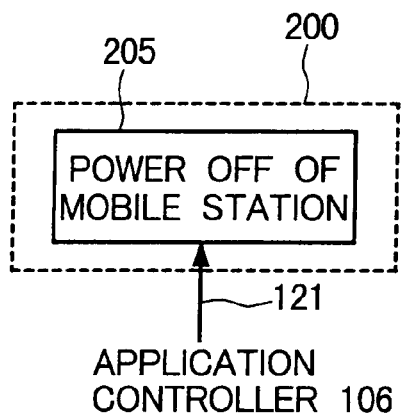
FIG. 9 is a constitution diagram for explaining a sixth example of application and
FIG. 10 is a constitution diagram for explaining a seventh example of application.
Figure 10:
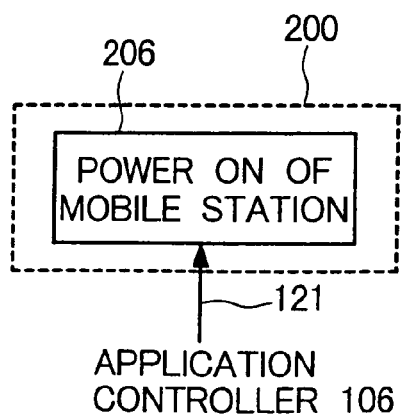

A sixth example of the application 200 shown in FIG. 9 is provided with a circuit 205 (for example, switch circuit) for making off power of the mobile station and brings about a state of making off power of the mobile station in accordance with the application control signal 121. On the other hand, a seventh example of the application 200 shown in FIG. 10 is provided with a circuit 206 (for example, switch circuit) for making on power of the mobile station and brings about a state of making on power of the mobile station in accordance with the application control signal 121.

Next, an explanation will be given of the position calculation controller 107 shown in FIG. 1. The position calculation controller 107 pertinently controls execution or abeyance of the position calculation at the position calculator 102 by using the result of comparison 120 inputted from the position controller 103 to thereby realize a reduction in power consumption of the mobile station.

The position calculation controller 107 executes a control of reducing a frequency of the position calculation when, for example, the mobile station is remote from the target position and increasing the frequency of the position calculation when conversely, the mobile station is close to the target position.

Further, as other control example, the position calculation controller 107 may execute a control in which there is used a history of the result of comparison 120 inputted from the position controller 103 and when the mobile station approaches rapidly to the target position, it is determined that moving speed of the mobile station is fast and the frequency of the position calculation is increased and when conversely, the mobile station approaches gradually to the target position, it is determined that the moving speed is slow and the frequency of the position calculation is reduced.

Further, the position calculation controller 107 may not execute the above-described control and the position calculator 120 may carry out a control of always executing the position calculation.

As described above, according to the present invention, the application is controlled in accordance with the current position and the target position of the person of holding the mobile station and service can be provided to the person of holding the mobile station or a third party.

Specifically, by setting a station or a bus stop where a person is to get off as the target position and using vibration or alarm as application, riding past of the person in an electric train or a bus can be prevented.

Further, by carrying the mobile station registered with a dangerous site or one's own house as the target position by a wondering old man or a child and using a telephone message as application, when the wondering old man or the child gets near to the dangerous site or remote from the house by a previously set distance or more, the fact is conveyed to a third party of a protector or the like and the protector proceeds to protect the wondering old man or the child to thereby avoid the danger.

Further, by setting a hospital, a movie theater or the like as the target position and using power on/off or ringer on/off of the mobile station as application, restriction of the function of the mobile station can automatically be carried out at a site bothering others thereby.

INDUSTRIAL APPLICABILITY

As described above, the mobile station according to the present invention is applied to a system of measuring the current position by utilizing wireless and is applicable also to a mobile wireless communication system such as a portable telephone or the like.

The invention claimed is:

1. A mobile station capable of calculating a current position by position calculation using radio wave, said mobile station comprising:
　a signal receiver for receiving radio wave;
　a position calculator for calculating the current position from a result of reception provided by the signal receiver;
　means for target position input for inputting a position constituting a target;
　a target position holder for holding the target position inputted from the means for target position input;
　a position comparator for comparing the current position of the mobile station calculated by the position calculator with the target position held at the target position holder;
　a position calculation controller for controlling a frequency of position calculation by the position calculator in accordance with a result of the position comparison by the position comparator;
　an application operated to a user based on the result of the position comparison by the position comparator; and
　an application controller for controlling operation of the application by using the result of the position comparison by the position comparator;
　wherein the position calculation controller uses a history of the result of the position comparison by the position comparator and executes the control of increasing the frequency of the position calculation by the position calculator when the mobile station approaches the target position at a high speed and executes the control of reducing the frequency of the position calculation by the position calculator when the mobile station approaches the target position at a low speed.

2. A mobile station according to claim 1,
　wherein the position calculation controller executes a control such that the position calculation controller increases a frequency of the position calculation by the position comparator when the result of the position comparison by the position comparator signifies that the current position and the target position are close to each other and executes a control such that the position calculation controller reduces the frequency of the position calculation by the position calculator when the result of the position comparison by the position comparator signifies that the current position and the target position are remote from each other.

3. A mobile station capable of calculating a current position by position calculation using radio wave, said mobile station comprising:
a signal receiver for receiving radio wave;
a position calculator for calculating the current position from a result of reception provided by the signal receiver;
means for target position input for inputting a position constituting a target;
a target position holder for holding the target position inputted from the means for target position input;
a position comparator for comparing the current position of the mobile station calculated by the position calculator with the target position held at the target position holder;
a position calculation controller for controlling a frequency of position calculation by the position calculator in accordance with a result of position comparison by the position comparator;
a vibration generator for vibrating the mobile station based on the result of the position comparison by the position comparator; and
a vibration controller for controlling generation and abeyance of vibration of the vibration generator by using the result of the position comparison by the position comparator;
wherein the position calculation controller uses a history of the result of the position comparison by the position comparator and executes the control of increasing the frequency of the position calculation by the position calculator when the mobile station approaches the target position at a high speed and executes the control of reducing the frequency of the position calculation by the position calculator when the mobile station approaches the target position at a low speed.

4. A mobile station according to claim 3,
wherein the position calculation controller executes a control such that the position calculation controller increases a frequency of the position calculation by the position comparator when the result of the position comparison by the position comparator signifies that the current position and the target position are close to each other and executes a control such that the position calculation controller reduces the frequency of the position calculation by the position calculator when the result of the position comparison by the position comparator signifies that the current position and the target position are remote from each other.

5. A mobile station capable of calculating a current position by position calculation using radio wave, said mobile station comprising:
a signal receiver for receiving radio wave;
a position calculator for calculating the current position from a result of reception provided by the signal receiver;
means for target position input for inputting a position constituting a target;
a target position holder for holding the target position inputted from the means for target position input;
a position comparator for comparing the current position of the mobile station calculated by the position calculator with the target position held at the target position holder;
a position calculation controller for controlling a frequency of position calculation by the position calculator in accordance with a result of position comparison by the position comparator;
an alarm generator for generating an alarm from the mobile station based on the result of the position comparison by the position comparator; and
an alarm controller for controlling generation and abeyance of the alarm of the alarm generator by using the result of the position comparison by the position comparator;
wherein the position calculation controller uses a history of the result of the position comparison by the position comparator and executes the control of increasing the frequency of the position calculation by the position calculator when the mobile station approaches the target position at a high speed and executes the control of reducing the frequency of the position calculation by the position calculator when the mobile station approaches the target position at a low speed.

6. A mobile station according to claim 5,
wherein the position calculation controller executes a control such that the position calculation controller increases a frequency of the position calculation by the position comparator when the result of the position comparison by the position comparator signifies that the current position and the target position are close to each other and executes a control such that the position calculation controller reduces the frequency of the position calculation by the position calculator when the result of the position comparison by the position comparator signifies that the current position and the target position are remote from each other.

7. A mobile station capable of calculating a current position by position calculation using radio wave, said mobile station comprising:
a signal receiver for receiving radio wave;
a position calculator for calculating the current position from a result of reception provided by the signal receiver;
means for target position input for inputting a position constituting a target;
a target position holder for holding the target position inputted from the means for target position input;
a position comparator for comparing the current position of the mobile station calculated by the position calculator with the target position held at the target position holder;
a position calculation controller for controlling a frequency of position calculation by the position calculator in accordance with a result of position comparison by the position comparator;
means for making a telephone call for making a telephone call based on the result of the position comparison by the position comparator;
a telephone number holder for holding a telephone number of a message destination used in making the telephone call by the means for making a telephone call;
a telephone message holder for holding a message transmitted after making the telephone call; and
an application controller for controlling to make the telephone call by the means for making a telephone call by using the result of the position comparison by the position comparator;
wherein the position calculation controller uses a history of the result of the position comparison by the position comparator and executes the control of increasing the frequency of the position calculation by the position calculator when the mobile station approaches the target position at a high speed and executes the control of reducing the frequency of the position calculation by the position calculator when the mobile station approaches the target position at a low speed.

8. A mobile station according to claim 7,
wherein the position calculation controller executes a control such that the position calculation controller increases a frequency of the position calculation by the position comparator when the result of the position comparison by the position comparator signifies that the current position and the target position are close to each other and executes a control such that the position calculation controller reduces the frequency of the position calculation by the position calculator when the result of the position comparison by the position comparator signifies that the current position and the target position are remote from each other.

9. A mobile station capable of calculating a current position by position calculation using radio wave, said mobile station comprising:
a signal receiver for receiving radio wave;
a position calculator for calculating the current position from a result of reception provided by the signal receiver;
means for target position input for inputting a position constituting a target;
a target position holder for holding the target position inputted from the means for target position input;
a position comparator for comparing the current position of the mobile station calculated by the position calculator with the target position held at the target position holder;
a position calculation controller for controlling a frequency of position calculation by the position calculator in accordance with a result of position comparison by the position comparator;
a switch for a ringer for making on or off a ringer when a telephone signal arrives at the mobile station based on the result of the position comparison by the position comparator; and
a ringer controller for controlling a switching operation of the ringer switch by using the result of the position comparison by the position comparator.

10. A mobile station according to claim 9,
wherein the position calculation controller executes a control such that the position calculation controller increases a frequency of the position calculation by the position comparator when the result of the position comparison by the position comparator signifies that the current position and the target position are close to each other and executes a control such that the position calculation controller reduces the frequency of the position calculation by the position calculator when the result of the position comparison by the position comparator signifies that the current position and the target position are remote from each other.

11. A mobile station according to claim 9,
wherein the position calculation controller uses a history of the result of the position comparison by the position comparator and executes the control of increasing the frequency of the position calculation by the position calculator when the mobile station approaches the target position at a high speed and executes the control of reducing the frequency of the position calculation by the position calculator when the mobile station approaches the target position at a low speed.

12. A mobile station capable of calculating a current position by position calculation using radio wave, said mobile station comprising:
a signal receiver for receiving radio wave;
a position calculator for calculating the current position from a result of reception provided by the signal receiver;
means for target position input for inputting a position constituting a target;
a target position holder for holding the target position inputted from the means for target position input;
a position comparator for comparing the current position of the mobile station calculated by the position calculator with the target position held at the target position holder;
a position calculation controller for controlling a frequency of position calculation by the position calculator in accordance with a result of position comparison by the position comparator;
a switch of power supply for switching power supply to the mobile station based on the result of the position comparison by the position comparator; and
a power supply controller for controlling a switching operation of the power supply switch by using the result of position comparison by the position comparator;
wherein the position calculation controller uses a history of the result of the position comparison by the position comparator and executes the control of increasing the frequency of the position calculation by the position calculator when the mobile station approaches the target position at a high speed and executes the control of reducing the frequency of the position calculation by the position calculator when the mobile station approaches the target position at a low speed.

13. A mobile station according to claim 12,
wherein the position calculation controller executes a control such that the position calculation controller increases a frequency of the position calculation by the position comparator when the result of the position comparison by the position comparator signifies that the current position and the target position are close to each other and executes a control such that the position calculation controller reduces the frequency of the position calculation by the position calculator when the result of the position comparison by the position comparator signifies that the current position and the target position are remote from each other.

* * * * *